June 2, 1970 E. HERTER 3,515,809

SUPERVISORY CIRCUIT ARRANGEMENTS

Filed Oct. 13, 1966

United States Patent Office 3,515,809
Patented June 2, 1970

3,515,809
SUPERVISORY CIRCUIT ARRANGEMENTS

Eberhard Herter, Stuttgart, Germany, assignor to International Standard Electric Corporation Filed Oct. 13, 1966, Ser. No. 586,526
Claims priority, application Germany, Oct. 20, 1965, St 24,536
Int. Cl. H04m 3/22
U.S. Cl. 179—18 9 Claims

ABSTRACT OF THE DISCLOSURE

A system for supervising loop resistance in telephone circuits is disclosed. A hexa-pole bridge circuit is used as an interrogating element and an AC voltage is supplied across input terminals of the bridge. The bridge is balanced when the loop resistance has such a value that the voltage in the neutral branch is zero. When the bridge is unbalanced, it provides a voltage which is in phase or out of phase relative to the interrogating AC voltage as the loop resistance rises or falls short. Suitable means are provided to measure the phase difference and either to indicate the difference or to provide a signal capable of use in control functions such as turning off ringing current.

The invention relates to circuit arrangements for supervising the loop resistance of telephone lines and more particularly to such circuit arrangements used in conjunction with line signalling arrangements wherein terminal resistors are connected to the line on the transmitting end and the loop resistance is determined on the receiving end using an interrogating voltage. For example, in a DC key dialling system, loop resistances are used by the telephone sets as signal criteria. The DC fed loop carries corresponding loop currents which, subdivided into corresponding ranges, represent the different signal criteria on the receiving end.

When implementing DC key dialling signalling systems, difficulties arise in providing a circuit arrangement to supervise the loop resistance. The difficulties occur because the line resistance cannot be kept constant without intricate adjusting processes, thus the different terminating resistors selected on the transmitting end as signal criteria, unfortunately, deviate more or less on the receiving end. Therefore, the terminal resistors do not always coincide with the criteria used because of adverse line influence. Such influences are, besides the variable line resistance, leakage resistances, feeder voltage fluctuations and induced interfering voltages.

The more resistance ranges or zones that must be discerned the more critical and difficult the supervision.

The circuit arrangements hitherto known for such supervision are substantially asymmetrical evaluating circuits. There are also a few symmetrical evaluating circuits known, but they are either too expensive or have too many other disadvantages.

In the asymmetrical circuit arrangements for evaluating the loop resistance, the voltage drop caused by the current in a wire is compared at a resistance of the feeder element with a suitably selected portion of the battery voltage, a so-called threshold voltage, located between two measuring ranges.

Among the disadvantages of the asymmetrical circuit arrangements are that the interfering current along the line, caused by the induced interfering voltage across the wire-ground capacity, is completely included in the measuring result, thereby falsifying the measuring result. Thus, at admissible interfering voltages the number of discernable resistance zones or ranges is limited.

Symmetrical relay circuit arrangements are known.

These excel in that the operating range is practically unlimited, so that very little protection against short-time excessive voltages is required. In addition, the symmetrical relay circuits enable a complete potential separation between the line to be supervised and the evaluating means. These advantages are cancelled by certain extreme disadvantages. The variations of the already mentioned threshold value of such switching means and the dependence of their resistance due to temperature cause substantial uncertainties in the evaluation obtained. Moreover, different types of relays must be used at different threshold values adding to the lack of reliability of the evaluation.

Accordingly, it is an object of the invention to provide a circuit arrangement for supervising the loop resistance of a telecommunication system, and particularly of telephone lines. The evaluation of the loop resistances is to be independent of induced interfering voltages and voltage fluctuations in the feeder circuit, thus substantially increasing the reliability of evaluation even at a plurality of resistance ranges.

A related object of this invention is to provide the new supervisory circuit arrangement operating substantially without delay, quickly indicating the investigated loop resistance range.

The supervisory circuit arrangement for supervising the loop resistance of telephone lines according to the invention, is characterized in this that a hexa-pole bridge type circuit is used as an interrogating element. The bridge is fed at its input with AC voltage and balanced at the output of the bridge type circuits with a predetermined loop resistance. The supervision is completed at the neutral branch of the bridge by an indicator which determines whether the indicated resistance exceeds or falls short of the loop resistance from the phase position of the voltage at the neutral branch as compared with the interrogating AC voltage. The interrogating element eliminates fluctuations of the interrogating voltage and the portions of the induced interferences cancel each other in the neutral branch. Balancing of the bridge-type circuit via the loop resistance automatically results in a threshold arrangement which furnishes different signals in the neutral branch above and below the predetermined loop resistance. These signals can be evaluated digitally in a simple way known to the art.

To supervise several different loop resistances, it is provided according to the invention, that the resistors leading to the neutral branch of the hexa-pole type bridge are made as multiple voltage dividers and the different tappings are supervised through separate indicators. The separation of ranges on the receiving end is obtained in that the bridge-circuit can be balanced at a respective tapping via the resistance values of the voltage dividers in case of different loop resistances.

In any case, the phase position of the voltage in the neutral branch with respect to the interrogating AC voltage is used to distinguish the different loop resistance values. When a predetermined loop resistance is exceeded, the voltage at the associated indicator is opposite in phase to the interrogating AC voltage. If a predetermined loop resistance has not been equalled the voltage at the associated indicator is in phase with the interrogating AC voltage. If the different indicators of the supervising circuit are included in a blocking chain circuit a distinct evaluation result can be derived at each loop resistance.

A further feature of the invention is that the evaluation of the loop resistance can be synchronized with a scanning device, if a gate-circuit is provided in the indicator. The gate is arranged to be driven either conductive or non-conductive by the voltage of the neutral branch depending on the polarity of the voltage with respect to the polarity of the interrogating AC voltage with respect to the polarity of the interrogatng AC voltages. This scanning can be extended for an arbitrary number of gate-circuit indicators, connected to the different tappings of the neutral branch voltage dividers.

In greater detail, the phase position can be investigated simply in that the interrogating AC voltage and the voltage in the neutral branch actuate a coincidence circuit. If both control voltages are in phase the coincidence circuit provides an output signal, while in case of counterphase of both control voltages no output signal is given.

The above mentioned and other features of this invention and the manner of obtaining them will become more apparent, and the invention itself will be best understood by reference to the following description of an embodiment of the invention taken in conjunction with the accompanying drawings, in which.

Figure 1:
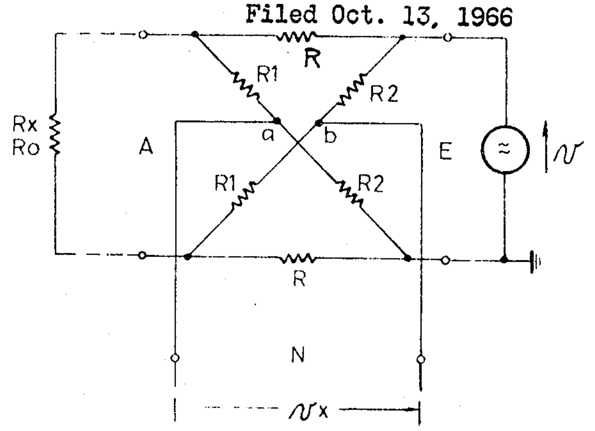
FIG. 1 shows a circuit diagram of the interrogating element according to the invention through which a simple digital discrimination of the loop resistance value is possible.

FIG. 1 shows the interrogating element, constructed as a hexa-pole bridge circuit. Said bridge is arranged symmetrically as is indicated by the same resistors R, R1 and R2 in corresponding bridge branches. The interrogating AC voltage $v$ is applied to the input E of the bridge-type circuit, while the output A is loaded by the loop resistance R$x$. A voltage $vx$ prevails at the neutral branch N of the bridge-type circuit. The bridge is balanced by selecting the resistors so that, at a predetermined loop resistance R$o$, the voltage in the neutral branch is zero.

With the aid of Kirchhoff's law it can be proved for this interrogating element that the potentials $\varphi ax$ and $\varphi bx$ at the points $a$ and $b$ are influenced by interfering voltages in the same way and that the effects of the interfering current cancel each other when forming the difference $\varphi ax - \varphi bx$. The following equation applies for said difference when feeding with a DC voltage V:

$$\frac{\varphi ax - \varphi bx}{V} = (Ro - Rx) \cdot \frac{R}{(Rx + 2R) \cdot (Ro + R)}$$

If an interrogating AC voltage $v$ is inserted for V, said voltage difference would change its sign at each half wave.

In order to obtain a distinct digital evaluation, the phase of the voltage $vx$ at the neutral branch N is compared with the phase of the interrogating AC voltage $v$.

If R$x$<R$o$, said voltage difference $vax - \varphi bx$ is in phase with the interrogating AC voltage $v$, while at R$x$>R$o$ the voltage difference $\varphi ax - \varphi bx$ is opposite in phase to the interrogating AC voltage $v$. Exceeding and falling short of the predetermined loop resistance R$o$ can distinctly be indicated by the different phase relation of the comparing voltages.

Figure 2:
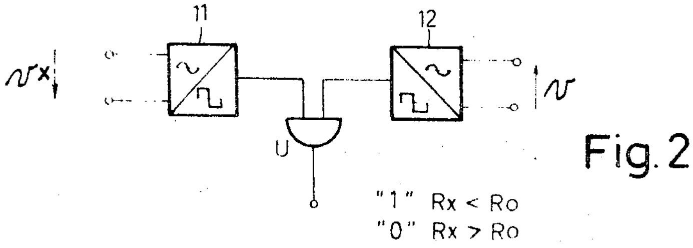
FIG. 2 shows an indicator as a block diagram, connectable to the neutral branch of the bridge-type circuit.

FIG. 2 shows a simple indicator which can discern said different phase relations. The two comparing AC voltages $vx$ and $v$ are converted into equivalent bipolar pulse sequences through arrangements known to the art, such as with converters 11, 12 shown in FIG. 2. The thus gained pulse sequences are led to the two control inputs of a coincidence circuit U. If both voltages are in phase the two control inputs of the coincidence circuit U are operated in the same sense at both half waves. The signal "1," appearing at the output, characterizes that the loop resistance R$x$ is smaller than the predetermined value R$o$. By a suitable arrangement of the control circuits of the coincidence arrangement U the output signal furnished appears as a permanent signal.

If the two voltages $vx$ and $v$ are not in phase the coincidence circuit U is not operated to conduct. The output signal "0" indicates that the loop resistance R$x$ is higher than the predetermined value R$o$.

Figure 3:
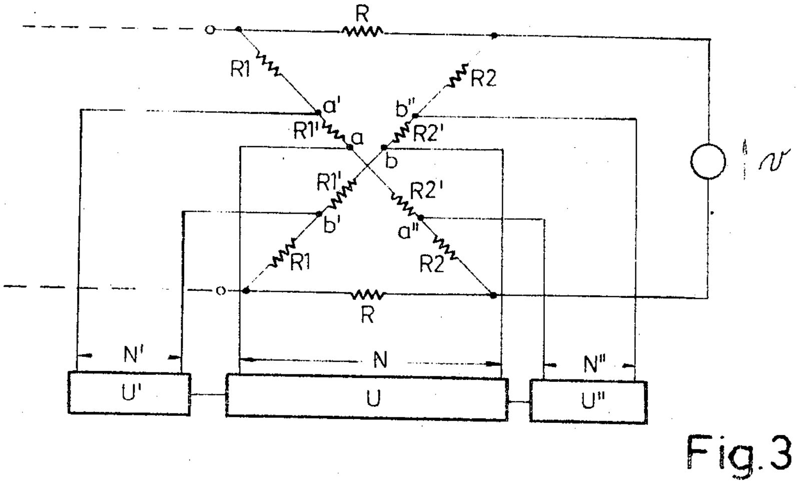
FIG. 3 shows a variation of the interrogating element of FIG. 1 wherein different loop resistance values obtain balance at selected different taps.

It should be mentioned that by subdividing the resistors R1 and R2 leading to the neutral branch N the measuring range can be divided several times. For example, as shown in FIG. 3, R1, R1', and R2, R2'. The voltage divider resistors can be designed in such a way that the bridge-type circuit tappings are balanced at different loop resistances. This enables the evaluation of different resistance values through the bridge-type circuit. In addition, FIG. 3 shows indication circuits U, U', U'' connected to the outputs N, N', N'' respectively to form a chain circuit.

The arrangement according to the invention, may also be used for an immediate stop of the ringing signal when the called subscriber answers. For example, if the ringing voltage is $v$ corresponding to the interrogating AC voltage and the resistance R$x$ of the ringing bell circuit or the parallel arranged ringing bell circuits is chosen to have a level higher than R$o$, then is lifted, device U will produce a change in its output voltage which can be used to block or inhibit the ring generator (in a manner not shown).

While the principles of the invention have been described above in connection with specific apparatus and applications, it is to be understood that this description is made only by way of example and not as a limitation on the scope of the invention.

I claim:

1. A circuit arrangement to supervise the loop resistance of telephone lines, the arrangement comprising a bridge circuit interrogating element having an input and an output and a neutral branch, alternating current voltage means for supplying the input with alternating current voltage, means for coupling the output of said interrogating element with a telephone line loop, the elements of said bridge being selected to provide electrical balance in the neutral branch when connected to a predetermined loop resistance, and means including an indicator connected to said neutral branch for comparing the voltage at said neutral branch with said interrogating alternating current voltage and for showing the result of the comparison.

2. The supervisory circuit arrangement of claim 1 wherein said interrogating element is a hexa-pole bridge circuit.

3. The supervisory circuit arrangement of claim 2 wherein the bridge resistors are arranged as multiple voltage dividers and tapping means are provided at each of said resistors of said multiple voltage dividers whereby certain pairs of said tapping means constitute separate neutral branches, and separate means including indicators are connected at each of said pair of said tappings to separately evaluate different loop resistances.

4. The supervisory circuit arrangement of claim 1 wherein the impedance values of the elements of said bridge circuit are chosen so that when the loop resistance exceeds said predetermined value, the neutral branch voltage is out of phase with the interrogating voltage.

5. The supervisory circuit arrangement of claim 4 wherein the impedance values of the elements of said bridge circuit are chosen so that when the loop resistance is less than said predetermined value the neutral branch voltage is in phase with the interrogating voltage.

6. The supervisory arrangement of claim 5 wherein a gate circuit is used with the said indicator, and the gate circuit is controlled by the phase relationship of the voltage of the neutral branch with respect to the interrogating AC voltage.

7. The circuit arrangement according to claim 3 wherein the separate means including an indicator are connected to form a blocking chain circuit.

8. The circuit arrangement according to claim 1 wherein the means including an indicator incorporates coincidence circuit means to determine the phase relationship of the interrogating AC voltage and the voltage in the neutral branch of the bridge circuit.

9. A circuit arrangement according to claim 8 for providing a signal for stopping ringing current when a called subscriber answers, in which the interrogating AC voltage is used as ringing voltage and the resistance of a ringing bell circuit on the subscriber end is selected to be high compared with the loop resistance occurring when the handset is lifted, whereby the coincidence circuit means can produce an output voltage of use in inhibiting the ring generator.

References Cited

UNITED STATES PATENTS

| | | |
|---|---|---|
| 3,078,346 | 2/1963 | Cartwright et al. |
| 3,156,778 | 11/1964 | Cirone. |

WILLIAM C. COOPER, Primary Examiner

U.S. Cl. X.R.

179—84